July 1, 1930. R. B. POGUE 1,768,929
ANNEALING POT
Filed Feb. 25, 1929
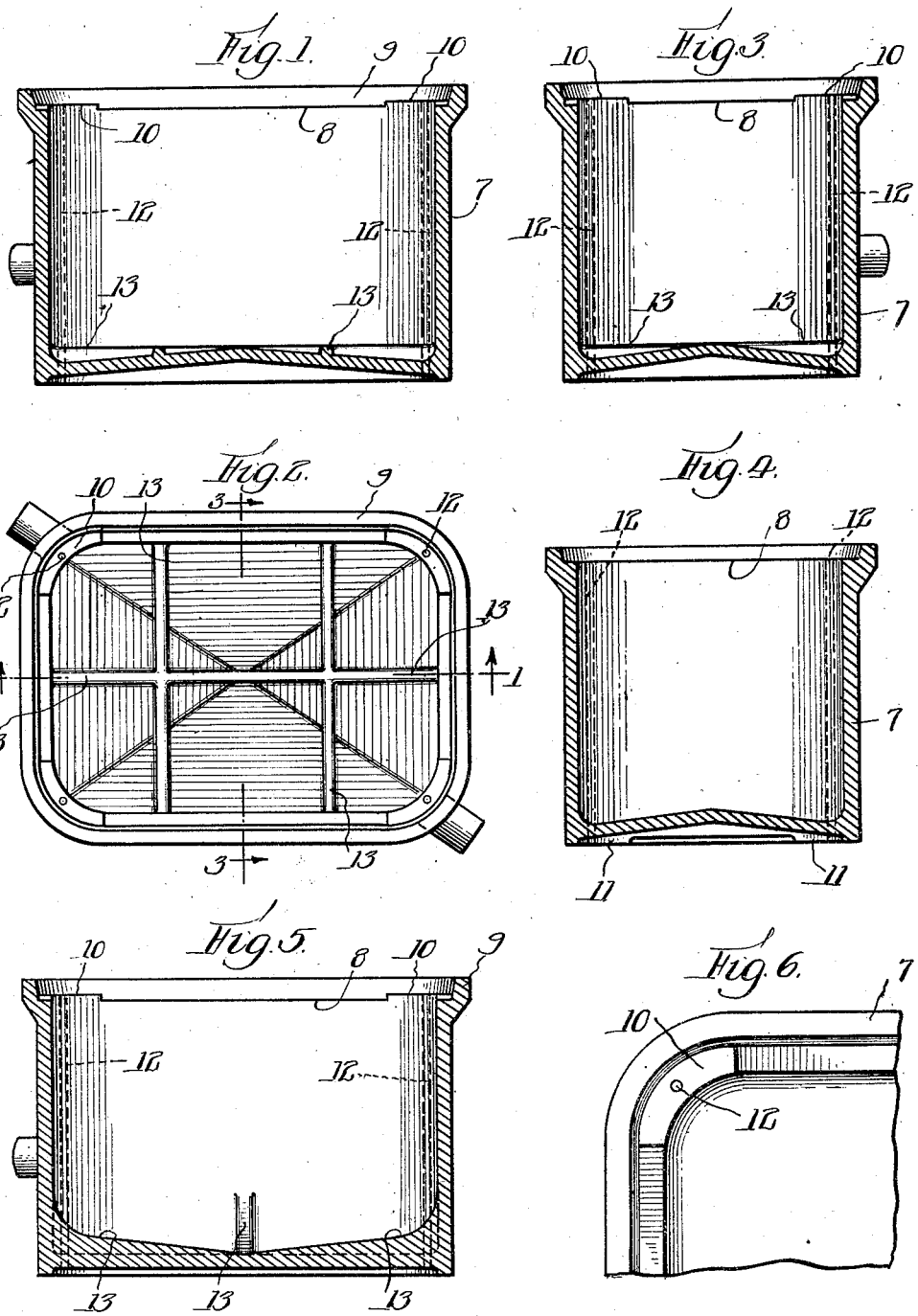
Inventor:
Robert B. Pogue Patented July 1, 1930

1,768,929

UNITED STATES PATENT OFFICE

ROBERT B. POGUE, OF CHICAGO, ILLINOIS, ASSIGNOR TO THE AMERICAN BRAKE SHOE & FOUNDRY COMPANY, OF WILMINGTON, DELAWARE, A CORPORATION OF DELAWARE

ANNEALING POT

Application filed February 25, 1929. Serial No. 342,631.

This invention relates to annealing pots and it has for its object to prolong the life of the pot and to prevent the sides and ends thereof from bulging and otherwise deforming due to the weight of the loaded pots when piled one upon the other in practice and to the heat to which they are subjected.

Another object of the invention is to provide each pot with means at its corners for receiving the load and for relieving the sides and ends of the pot from excessive pressures and strains.

Another object of the invention is to provide means at the corners of a pot for carrying the load of superposed pots and for strengthening the corners to withstand the loads to which they may be subjected.

And a further object of the invention is to reinforce and strengthen the bottom of the pot to withstand the loads to which it is subjected in practice.

In the accompanying drawing I have illustrated selected embodiments of the invention and, referring thereto.

Fig. 1 is a longitudinal sectional view on the line 1—1 of Fig. 2.

Fig. 2 is a top plan view.

Fig. 3 is a transverse sectional view on the line 3—3 of Fig. 2.

Fig. 4 shows a modified construction.

Fig. 5 is a longitudinal sectional view showing the bottom of the body reinforced interiorly.

Fig. 6 is a detail plan view.

Referring to the drawings, the pot 7 may be rectangular in shape with rounded corners, as illustrated, and provided with a seat 8 at its top with a surrounding flange 9 to receive the bottom of a superposed pot when a plurality of pots are arranged in a stack in an annealing oven, according to regular practice. It has been found that annealing pots bulge at their sides and to a less extent at their ends during the annealing treatment which is due to the great weight of the pots and their contents in the stack and to the heat to which they are subjected. I have found that this can be overcome by arranging to carry the weight upon the corners of the pots and this can be accomplished in a simple and effective manner by providing the seats with steps 10, Figs. 1, 2, 3, 5 and 6, at the corners sufficiently higher than the seats to support a superposed pot entirely clear of the seat between the steps; or by providing steps 11 on the bottom of the pot and at the corners thereof as shown in Fig. 4. These steps extend sufficiently about the corners of the pots to form a substantial support for superposed pots and they may be made of any height suitable for the purpose of carrying the weight of superposed pots. In some cases it may be desirable to reinforce and strengthen the corners of the pots by embedding vertically disposed rods 12 therein. The pots are usually made of white cast iron and the rods should be made of alloy steel or other substantial heat resisting metal.

In actual practice, the bottom of a pot is subjected to severe treatment and frequently cracks and breaks down rendering the pot useless. Various efforts have been made to reinforce and strengthen the pot bottom by the provision of outside ribs or the like, but I have found that much better results may be obtained by providing interior tapering ribs 13 which extend part way across the bottom of the pot from the sides or ends and are widest at the sides or ends. These ribs may be arranged in any desired manner on the bottom of the pot extending from the sides or from the ends, or from the sides and ends, and one or more ribs may be connected to each side and end. The bottom may be flat as shown in Fig. 5, or it may be concave as shown in Fig. 1.

The ribs curve up the sides and ends of the pot and merge therewith, and they fade away at their other ends in the bottom of the pot.

The improvements herein described are simple in character but they are of substantial importance because they have been found in actual practice to prolong the life of a pot materially. Annealing pots are subjected to rough usage and severe action by heat and flames. They are heavily loaded and are stacked three or more pots high so that the lower pots carry heavy loads. The result has been that the sides and the ends, but particularly the sides, of the pots bulge outwardly and are thereby subjected to strains which cause cracks and such damage to the pots that they are rendered unfit for further use. By arranging to carry the load at the corners of the pot the bulging of the sides and ends has been materially reduced and practically eliminated, and the life of the pot has thereby been prolonged representing an important economical saving. While I do not consider the embedded rods essential, I do believe they will reinforce and strengthen the corners of the pot and assist in prolonging the life of the pot.

I have shown and described the invention as applied to a substantially rectangular pot, which is the shape commonly used, but I do not limit the invention to pots of this shape because it will be apparent that it may be satisfactorily used in pots of other shapes, and I reserve the right to make such changes and all other changes that may be found desirable within the scope of the following claims:

I claim:

1. An annealing pot having a seat at the top thereof and elevated steps spaced apart on said seat adjacent the corners, said steps being disposed in a plane higher than the plane of the seat and being adapted to receive and support a superimposed pot, and a flange surrounding said seat and said steps.

2. An annealing pot having a seat within the body thereof and elevated reenforcing steps on the seat at the corners of the body, said steps supporting a superimposed pot thereon entirely clear of the seat between the steps.

3. An annealing pot having steps spaced about its upright walls to carry the weight of superposed pots, and reinforcing rods embedded in the upright walls of the pot at said steps and extending from top to bottom of the said walls and into the steps.

4. An annealing pot having interior tapering ribs on its bottom, said ribs being widest at the upright walls of the pot and tapering therefrom.

5. An annealing pot having interior tapering ribs on its bottom within the same, said ribs curving up the sides and ends of the pot and merging therewith.

ROBERT B. POGUE.